United States Patent [19]

Kalmanash

[11] Patent Number: 4,468,691
[45] Date of Patent: Aug. 28, 1984

[54] STROKE DURING RETRACE COLOR SWITCH

[75] Inventor: Michael H. Kalmanash, Fairfield, Conn.

[73] Assignee: United Technologies Corporation, Hartford, Conn.

[21] Appl. No.: 259,383

[22] Filed: May 1, 1981

[51] Int. Cl.³ .................... H04N 9/27; H01J 29/80
[52] U.S. Cl. ........................................ 358/73; 315/375
[58] Field of Search .................................. 358/72, 73; 315/30.31 R, 379, 382, 375, 376, 10; 307/246, 252, 252 J, 252 K

[56] References Cited

U.S. PATENT DOCUMENTS

| | | | |
|---|---|---|---|
| 3,492,416 | 1/1970 | Weber | 375/37 |
| 3,619,647 | 11/1971 | Barkow | 358/73 |
| 3,863,097 | 1/1975 | Labudda | 315/375 |
| 3,887,838 | 6/1975 | Thurston | 315/376 |
| 3,914,617 | 10/1975 | Corbel | 358/73 |
| 4,092,566 | 5/1978 | Chambers | 315/375 |
| 4,104,564 | 8/1978 | Cohen | 358/73 |
| 4,151,444 | 4/1979 | Jenness | 358/73 |
| 4,160,996 | 7/1979 | Nigra | 358/73 |
| 4,281,272 | 7/1981 | Spilsbury | 358/73 |

*Primary Examiner*—Tommy P. Chin
*Attorney, Agent, or Firm*—Richard P. Lange

[57] ABSTRACT

A high voltage color switch for a beam penetration CRT is well suited to generating a color write in one or more random colors during the retrace interval of a TV raster scan, or the like. The scanning period of the TV raster is in the baseline color for maximum resolution and brightness. A driver connected to the high voltage transformer includes a low voltage power supply which has one portion controlled by a switch. During the color write period the switch is closed so that the driver can provide a suitable waveform to the transformer to obtain the required swing. During the raster scan, the switch is open so that the magnetizing current in the transformer can be reset over the entire TV raster scan interval causing only a slight offset in the baseline color.

5 Claims, 2 Drawing Figures

STROKE DURING RETRACE COLOR SWITCH

STROKE DURING RETRACE COLOR SWITCH

4,468,691

STROKE DURING RETRACE COLOR SWITCH

CROSS REFERENCE TO RELATED APPLICATIONS

The subject matter of this patent application is related to that disclosed in U.S. Patent Application Ser. No. 259,342 filed May 1, 1981 by M. H. Kalmanash for RANDOM COLOR SWITCH FOR BEAM PENETRATION CRT now U.S. Pat. No. 4,356,435, issued Oct. 26, 1982; to U.S. Patent Application Ser. No. 259,343 filed May 1, 1981 by M. H. Kalmanash for DUAL MODE COLOR SWITCH FOR BEAM PENETRATION CRT now U.S. Pat. No. 4,337,420, issued June 29, 1982; to U.S. Patent application Ser. No. 259,344 filed May 1, 1981 for IMPROVED SEQUENTIAL COLOR SWITCH FOR BEAM PENETRATION CRT now U.S. Pat. No. 4,337,421, issued June 29, 1982; to U.S. Patent application Ser. No. 259,381 filed May 1, 1981 by M. H. Kalmanash et al. for DIFFERENTIAL RANDOM COLOR SWITCH FOR BEAM PENETRATION CRT; to U.S. Patent Application Ser. No. 259,394 filed May 1, 1981 by M. H. Kalmanash for CONSTANT CURRENT BIAS COLOR SWITCH FOR A BEAM PENETRATION CRT; and to U.S. Patent Application Ser. No. 284,831 filed July 20, 1981 by M. H. Kalmanash for MODULAR HIGH SPEED COLOR SWITCH now abandoned, all of which are assigned to the same assignee as the present case.

TECHNICAL FIELD

This invention relates to a high voltage color switch for use with a beam penetration-type CRT and more particularly, to a color switch which is well suited to providing a color write period during the retrace interval of a television raster scan.

BACKGROUND ART

A beam penetration-type color CRT (cathode-ray tube) is generally known and is a display device having a faceplate on which an image or alphanumeric characters can be written. One or more phosphor layers on the inner surface of the faceplate can be selected to emit almost any desired wavelength of visible light. If two layers of phosphor are deposited on the faceplate, it is possible to display more than two distinct colors by changing the depth of penetration of the electron beam into the phosphor layers. Because the electron beam emitted by the cathode in the neck of the CRT strikes the phosphor layers at a velocity influenced primarily by the voltage level on the accelerating anode, a change in the voltage level applied to the accelerating anode will correspondingly change the proportion of light emitted by the two phosphor layers. In other words, in a penetration CRT with two layers of different light emitting phosphor up to about four colors can be displayed to a viewer by changing the DC voltage level applied to the accelerating anode positioned near the front of the CRT.

A significant limitation encountered in the use of penetration-type CRT's is related to the length of the reset period between write periods. Because the DC voltage level on the accelerating anode must be changed during the reset period, the length of the reset period is primarily defined by the electrical capacitance associated with the anode. The anode has a relatively large physical size and, as such, inherently has a large capacitance resulting in a significant amount of electrical charge being stored thereon during a write period. Of course, any additional capacitors, particularly large capacitors which are often used in high voltage power supplies, also increase the capacitance in the high voltage circuit and add to the reset period. Because this electrical charge is increased, or decreased, to change the voltage level on the anode, the reset period separating two write periods is related to the charge/discharge rate inherently associated with the total capacitance seen by the high voltage power supply.

Another limitation found in prior art color switches used with beam penetration CRT's is related to the sequencing of the colors to be displayed on the CRT faceplate. Although it is possible to display between three or four distinguishable colors on a two-layer penetration CRT, some high voltage color switches must operate in a particular sequence. In other words, the high voltage color switch provides one preselected voltage level to the anode in successive write periods, that is, the anode voltage is changed from 10 KV to 14 KV, from 14 KV to 18 KV and finally from 18 KV back to 10 KV. During each of these sequential write periods, images or alphanumerics written by the electron beam are displayed only in that color corresponding to the voltage level impressed on the anode. If images or alphanumerics are to be displayed in one color, such as red, during a particular write period, then at the completion of that write period no additional red information can be displayed until the high voltage color switch sequences through its preselected voltage levels to the next write period at which red information can be displayed.

Of particular interest is U.S. Pat. No. 3,906,333 issued Sept. 16, 1975 to M. Kalmanash for LOW COST SWITCHING HIGH VOLTAGE SUPPLY, assigned to the same assignee as the present case, which describes a switching high voltage power supply for use with a beam penetration-type cathode-ray tube. This power supply has the secondary of a high voltage step-up transformer in series with the accelerating anode of the cathode-ray tube. The primary of the transformer is connected to ground through a capacitor for developing a DC voltage level. This voltage across the capacitor is fed to the regulating input of the baseline DC high voltage power supply. The color switching power supply of the present invention is an improvement over that described in this patent.

Another patent of interest is U.S. Pat. No. 4,092,556 issued May 30, 1978 to D. Chambers et al. for SWITCHED HIGH VOLTAGE POWER SUPPLY SYSTEM. This patent describes a high voltage power supply for the rapid switching of high voltage applied to the anode of a beam penetration color cathode-ray tube. The energy for making the rapid transition between voltage levels is stored in two inductors, one for upward transitions and the other for downward transitions. When it is desired to change the voltage applied to the cathode-ray tube, the appropriate one of the storage inductors is coupled through a control switch to the anode causing the voltage applied to the anode to change at a rapid rate. The voltage rises until the desired voltage level corresponding to a desired upward color is reached at which time the switch is turned off and the storage inductor recharged. A tracking high voltage supply maintains the anode at the predetermined voltage level once that level has been reached.

DISCLOSURE OF THE INVENTION

It is an object of the present invention to provide a small, low cost, high voltage color switch for beam penetration CRT which is well suited to providing color write periods in a secondary color or contrasting color during the vertical retrace interval of a TV raster scan.

A particular feature of the high voltage color switch for a beam penetration CRT according to the present invention is that the entire retrace interval of a TV raster scan is a low voltage portion of the power supply connected to the driver circuit thereby reducing the amount of energy dissipated by the low voltage power supply.

Another feature of the present invention is that the normal voltage level providing DC power to the driver circuit during the TV raster vertical retrace interval for stroke writing is disconnected or turned off, during the TV raster scan so that a lower voltage source with a lower power dissipation level can be used thereby conserving power.

A particular feature of the stroke during retrace color switch according to the present invention is that a DC amplifier coupled across the primary winding of a transformer senses the color drive waveform presented to the transformer primary. This waveform is integrated to a DC level to bias the driver circuit thereby compensating for changes in DC level associated with that waveform. In other words, the DC level of the stroke write waveform is sensed in the feedback loop and the level associated with that waveform is driven to zero. This causes a slight DC offset in the potential supplied to the anode during the TV raster scan interval. Because the TV raster scan interval is significantly larger than the stroke write period, this offset is quite small and is essentially not perceivable on the TV screen during the TV raster scan.

According to the present invention a high voltage color switch for a beam penetration CRT includes a high voltage power supply connected through a transformer secondary winding to the anode of the CRT. The primary winding of the high voltage transformer is coupled to the output of the driver which provides a current to the primary winding. The low voltage power supply to the driver is switch controlled so that the operating voltage level presented to the driver can be changed from a high voltage during the retrace interval of a TV raster scan and lower voltage during the TV raster scan period. A feedback loop coupled across the primary winding of the transformer senses any DC errors associated with the waveform applied to the primary winding. This feedback signal is presented to a high gain DC error amplifier which adjusts the bias voltage on the driver circuit.

The foregoing and other objects, features and advantages of the stroke during retrace color switch for a beam penetration CRT will become more apparent from the following description of a preferred embodiment and accompanying drawing.

BEST MODE FOR CARRYING OUT THE INVENTION

Figure 1:
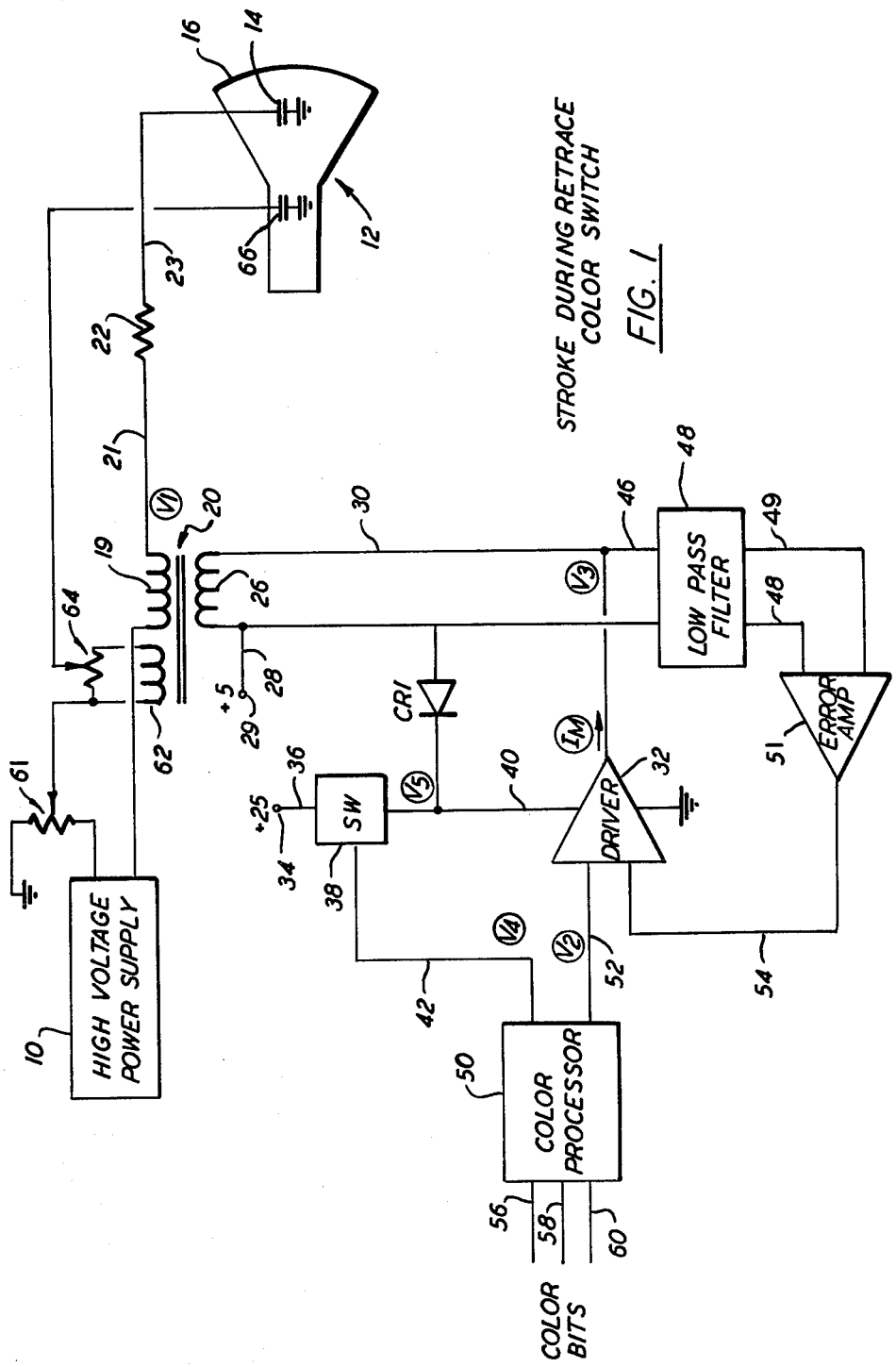
FIG. 1 is a schematic block diagram depicting one embodiment of the stroke during retrace color switch for a beam penetration CRT according to the present invention.

Referring first to FIG. 1, there is seen one embodiment of the stroke during retrace color switch for a beam penetration tube according to the present invention. In preferred form, a high voltage power supply 10 of a known type is provided and its DC output voltage is selected to provide a predetermined baseline color (described in greater detail hereinafter) in a beam penetration CRT (cathode-ray tube) 12. As is known, the CRT 12 includes an anode 14 to which a high voltage is applied, causing the beam of electrons emitted by a cathode (not shown) located in the tube neck to accelerate toward the faceplate 16 located across the front of the tube. The inner surface of the faceplate 16 typically has at least two layers of phosphor deposited thereon, each layer emitting a distinct wavelength or color of light in response to being excited by an electron beam. For the purposes of appreciating the present invention, it will be assumed that there is one layer of green phosphor (green being the baseline color) and one layer of red phosphor on the inner surface of the faceplate 16. However, it should be understood that phosphors which emit different colors could also be use. In addition, if more than about four distinct colors are desirable, more than two layers of phosphor could be deposited on the faceplate of the CRT 12. The anode 14 is formed from a material of high conductivity and is positioned circumferentially around the front portion of the tube near the faceplate 16. Because of its large size, the anode 14 has a relatively high capacitance and, for the purposes of simplicity, is illustrated in FIG. 1 as a capacitor.

In accordance with the present invention, the output of the high voltage power supply 10 is presented along a line 18 to one end of a secondary winding 19 of a transformer 20. The other end of the secondary winding 19 is connected by a lead 21 to one end of a damping resistor 22. The other end of the damping resistor 22 is connected by a lead 23 to the anode 14 of the CRT 12. The just described circuit is essentially a high voltage circuit operating in the range of, for example, 10 KV to 18 KV to provide voltage levels suitable for driving the anode 14. In the present invention, that color in which information would be displayed during the raster scan is the baseline color and is displayed by the CRT 12 most of the time. The baseline color is green and, in the present embodiment, is obtained in the present case by impressing 18 KV on the anode 14. The secondary colors are those to which the CRT 12 can display for a shorter period of time and can be obtained by changing the voltage level impressed on the anode 14 from 18 KV (green) to either 10 KV (red), 14 KV (orange) or 16 KV (yellow).

The transformer 20 also has a primary winding 26 and the turns ratio is selected to provide the needed voltage swing in the known manner. For example, if a 1 to 320 turns ratio were employed in the transformer 20, a 25 V change across the primary winding 26 would cause an 8 KV change across the secondary winding 19. If the upper end of this voltage swing were tied to the baseline voltage level of 18 KV, a resulting voltage swing on the line 21 is from 18 KV down to 10 KV, all of this being well known to those of ordinary skill. In the present embodiment, one end of the primary winding 26 is connected by a lead 28 to a terminal 29 to which a relatively low voltage is applied, typically 5 volts, from a low voltage power supply (not shown). The other side of the primary winding 26 is connected by a lead 30 to the output of a driver 32, such as an operational amplifier with a high current gain. The driver 32 is powered by a low voltage power supply (not shown) through a terminal 34 which has a positive potential applied thereto. The terminal 34 is connected by a line 36 to a switch 38, the output of which is connected by a line 40 to the driver 32. The switch 38 is enabled by a control signal supplied to its control terminal along the line 42.

One feature of the present invention involves a feedback path which senses the DC voltage level of a waveform provided to the primary winding 26 and adjusts the waveform from the driver 32 to prevent saturation of the transformer 20. This feedback path includes a lead 44 and lead 46 which are connected to leads 28 and 30, respectively, on oppsite sides of the primary winding 26. A low-pass filter 48 connected to leads 44 and 46 integrates the voltage waveforms on opposite sides of the primary winding into DC levels. The output from the low pass filter is connected by leads 48 and 49 to the input of an amplifier 51, the output of which is connected to one input of the driver 32 by a line 54. Thus, any discrepancy in the DC signals from the primary winding 26 is presented to the input of the error amplifier 32 to be amplified and finally presented to the driver 32 which correspondingly changes the DC level of any output waveform.

Incoming color information is presented to the color switch of the present invention on the lines 56 and 58, or equivalent, from an external source (not shown). In the case where the color switch of the present invention was used to write information on the faceplate 16 during the retrace interval associated with a TV-type raster scan, deflection circuitry and related components including a deflection yoke for the CRT 12 must be provided. None of these components are shown because they are well known in the art and play no part in the present invention. The input color information is presented to a color processor 50, which itself may be part of a larger more comprehensive control system for a CRT display, or could be a dedicated device capable of performing the simple logic steps required in the present invention. The binary signals into the color processor 50 indicate whether the baseline color green or one of the secondary colors are to be displayed on the faceplate 16 of the CRT 12. The color processor 50 then presents an output waveform on the line 52 to the driver circuit 32 during the retrace interval indicating which color is to be displayed.

A particular feature of the present invention is that it also provides dynamic tracking color focus voltage for the CRT 22. In preferred form this includes a first potentiometer 61 which is coupled to the output of the high voltage power supply 10. This is a separate output which has a lower DC level than the output used to supply the anode voltage. The first potentiometer 61 is connected through a winding 62 which is an additional winding on the transformer 16 to a second potentiometer 64. The potentiometer 64 is used to provide dynamic adjustment to the voltage applied to the focus electrode 66 which is located near the front portion of the electron gun (not shown). Typically, the focus voltage level applied to the focus electrode is a fixed percentage level of the voltage applied to the anode 14. A particular feature of the present invention is that this focus system requires a minimum of additional parts, only a couple of potentiometers and the additional winding on the transformer 20. The first potentiometer 61 adjusts the DC baseline voltage level while the second potentiometer 64 adjusts the dynamic output to the level applied to the focus electrode 66.

Figure 2:
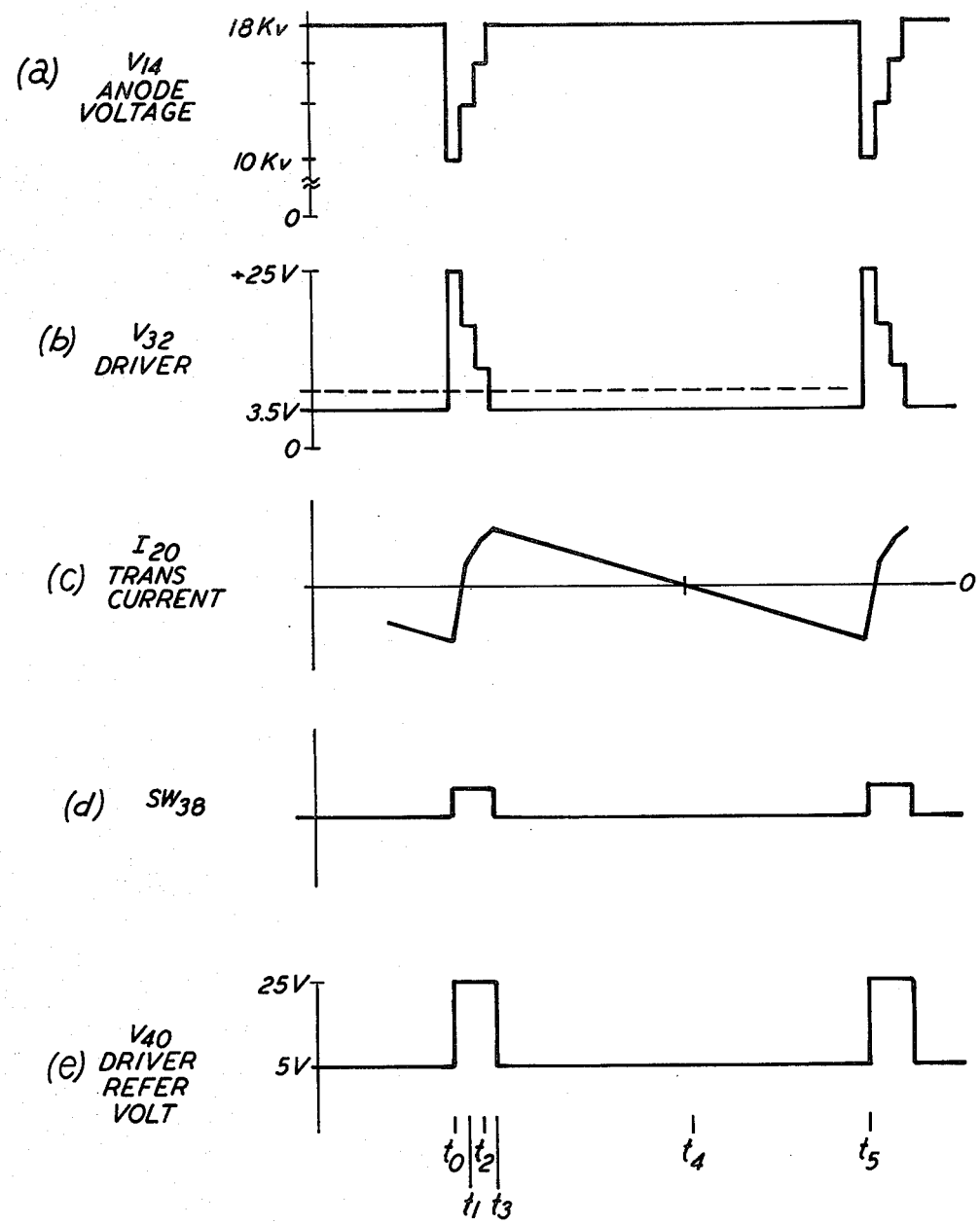
FIG. 2 is a diagram depicting typical waveforms at various points in the embodiment of FIG. 1.

Referring now to FIG. 2, the operation of the stroke during retrace color switch according to the present invention will now be described. As briefly mentioned herebefore, the color switch of the present invention is well suited to providing a color write period in a secondary color during a vertical retrace interval of a TV raster scan. The present invention has the capability of utilizing almost the entire retrace interval in a TV raster scan, approximately one millisecond, as a write period for a secondary color without the need for resetting the voltage level to the anode 14 during the raster retrace period. In other words, the color switch of the present invention allows the longest possible color write period for secondary colors during the retrace interval of a TV raster scan while not perceivably affecting the baseline color displayed on the faceplate of the CRT during a TV raster scan.

Another aspect of the present invention is the power conservation resulting from changing the voltage level to the driver 32. This is essentially accomplished by powering the driver circuit 32 during the raster scan from a low voltage portion of the low voltage power supply and then switching to the normal voltage drive potential during just the retrace interval of the raster scan so that a voltage waveform of the correct magnitude may be impressed on the anode 14 during the secondary color write periods.

As is seen in FIG. 2, an overall TV raster scan period is typically about 16 milliseconds, or from time $t_0$–$t_4$, the retrace portion of which is from about 1 millisecond or from time $t_0$–$t_3$. During the major portion of each TV raster scan, i.e., time $t_3$–$t_5$ the baseline color, green, is displayed since at the highest anode voltage, 18 KV, the greatest resolution and brightness is available to a viewer. At time $t_0$ the secondary color write period, which may be for more than one secondary color, is initiated by a control pulse (FIG. 2d) which enables the switch 38 allowing the full 25 volt DC drive voltage (FIG. 2e) to be presented to the driver 32. Simultaneously, at time $t_0$ a stepped voltage waveform (FIG. 2b) related to the desired colors to be displayed is presented to line 52 and the input of the driver 32. With the particular waveform illustrated, the voltage level presented to the anode is successively stepped through the voltage level to create a red color write period, time $t_0$–$t_1$, an orange color write period, time $t_1$–$t_2$, and yellow color write period, time $t_2$–$t_3$, and during each color write period information is written on the faceplate of the CRT 12 in the respective secondary color. During this secondary color write period, the magnetizing current in the primary winding 26 (FIG. 2c) is subjected to a high rate of change which, by time $t_3$, stores a significant amount of energy in the magnetic field associated with the transformer 20.

A feature of the present invention is that the high voltage portion of the low voltage power supply is turned off during the TV raster scan to conserve energy. During this time a low voltage portion of the low voltage power supply is connected to the driver circuit to provide a low voltage power level which powers the driver during the raster scan. Even though the driver supplies the same amount of current during the TV raster scan, because it is powered by the lower voltage portion of the power supply, less power is dissipated.

Although this invention has been shown and described with respect to a preferred embodiment, it will be understood by those skilled in this art that various changes in form or detail thereof may be made without departing from the spirit and scope of the claimed invention.

I claim:

1. A high voltage color switch for a beam penetration CRT in which a baseline color is normally displayed in a TV raster format but can be switched for a color write period of predetermined interval that is separated by an intervening period, comprising:

high voltage power supply means connectable to said cathode-ray tube, and having an output voltage selected to provide a predetermined baseline color;

a transformer connected between the output of said high voltage power supply means and said beam penetration CRT;

driver means connected to said transformer for amplifying an input waveform received during a color write interval and for providing a magnetizing current to said transformer;

a low voltage power supply means having a higher voltage portion and a lower voltage portion;

switch means connected between said higher voltage portion of said low voltage power supply means and said driver means for disconnecting said high voltage portion of said low voltage power supply means from said driver means after each color write interval; and whereby said switch means between the high voltage portion of said low voltage power supply means and said driver means is opened after said color write period allowing said magnetizing current to reset over said intervening period.

2. A high voltage color switch according to claim 1, wherein said cathode-ray tube includes a focus electrode, and wherein a means is provided for creating a focus voltage that tracks said output voltage from said high voltage power supply means.

3. A high voltage color switch according to claim 2, wherein said means for providing a focus voltage includes a focus voltage winding on said transformer connected between said high voltage power supply means and said focus electrode of said CRT.

4. A high voltage color switch according to claim 3, wherein said means for providing a focus voltage includes a first potentiometer connected between said high voltage power supply means and said focus voltage winding winding of said transformer means for proportionally adjusting the focus voltage level from said high voltage power supply means.

5. A high voltage color switch according to claim 4, wherein said means for adjusting the focus voltage further includes a second potentiometer coupled across the focus winding of said transformer to proportionally adjust a voltage swing of said focus voltage applied to said focus electrode.

* * * * *

UNITED STATES PATENT AND TRADEMARK OFFICE
CERTIFICATE OF CORRECTION

PATENT NO. : 4,468,691

DATED : August 28, 1984

INVENTOR(S) : Michael H. Kalmanash

It is certified that error appears in the above-identified patent and that said Letters Patent is hereby corrected as shown below:

Column 4, line 25: "use" should be --used--

Column 8, line 22: delete "winding" (second occurrence)

Signed and Sealed this

Seventh Day of May 1985

[SEAL]

Attest:

DONALD J. QUIGG

Attesting Officer     Acting Commissioner of Patents and Trademarks